(12) United States Patent (10) Patent No.: US 12,628,093 B2
Koskela et al. (45) Date of Patent: May 12, 2026

(54) POWER HEADROOM REPORT FOR A SERVING CELL

(71) Applicant: NOKIA TECHNOLOGIES OY, Espoo (FI)

(72) Inventors: Jarkko Koskela, Oulu (FI); Samuli Turtinen, Ii (FI); Chunli Wu, Beijing (CN); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 446 days.

(21) Appl. No.: 17/999,374

(22) PCT Filed: May 20, 2020

(86) PCT No.: PCT/CN2020/091438
§ 371 (c)(1),
(2) Date: Nov. 18, 2022

(87) PCT Pub. No.: WO2021/232324
PCT Pub. Date: Nov. 25, 2021

(65) Prior Publication Data
US 2023/0239811 A1 Jul. 27, 2023

(51) Int. Cl.
*H04W 52/36* (2009.01)
*H04W 72/0457* (2023.01)

(52) U.S. Cl.
CPC ..... *H04W 52/365* (2013.01); *H04W 72/0457* (2023.01)

(58) Field of Classification Search
None
See application file for complete search history.

(56) References Cited

U.S. PATENT DOCUMENTS

| | | | |
|---|---|---|---|
| 2012/0176924 A1 | 7/2012 | Wu et al. | |
| 2013/0188570 A1 | 7/2013 | Zhao et al. | |
| 2015/0003345 A1 | 1/2015 | Kuo | |
| 2017/0195998 A1* | 7/2017 | Zhang | H04L 5/0057 |
| 2018/0213366 A1* | 7/2018 | Seo | H04W 52/143 |

(Continued)

FOREIGN PATENT DOCUMENTS

| | | |
|---|---|---|
| CN | 102104905 A | 6/2011 |
| CN | 103392371 A | 11/2013 |

(Continued)

OTHER PUBLICATIONS

Office Action for Chinese Application No. 202080102708.1 dated Nov. 8, 2024, 10 pages.

(Continued)

*Primary Examiner* — Kodzovi Acolatse
(74) *Attorney, Agent, or Firm* — ALSTON & BIRD LLP

(57) ABSTRACT

Methods and apparatuses for PHR for a serving cell, wherein an active BWP of the serving cell is a dormant BWP. A UE sends a PHR to at least a network node to report PH of the serving cell; the network node receives the PHR from the UE to report PH of the serving cell and obtains PH value from the PHR for the serving cell. Herein at least one of the following is reported for the serving cell: 1) Type 1 PH; 2) Type 3 PH; 3) a designated field indicating whether the PH is Type 1 or Type 3; 4) a designated field indicating whether the serving cell is on a dormant BWP or non-dormant BWP.

12 Claims, 4 Drawing Sheets

(56) References Cited

U.S. PATENT DOCUMENTS

| | | | | |
|---|---|---|---|---|
| 2019/0053170 A1 | 2/2019 | Lee et al. | | |
| 2019/0306739 A1 | 10/2019 | Kim et al. | | |
| 2020/0029316 A1* | 1/2020 | Zhou | ............... | H04W 74/0833 |
| 2020/0068509 A1 | 2/2020 | Ahn et al. | | |
| 2021/0037482 A1* | 2/2021 | Shin | ............... | H04W 72/56 |
| 2021/0176029 A1* | 6/2021 | Tsai | ............... | H04B 7/0626 |
| 2021/0250156 A1* | 8/2021 | Kim | ............... | H04L 5/0098 |
| 2021/0250920 A1* | 8/2021 | Kim | ............... | H04W 72/0453 |
| 2021/0297959 A1* | 9/2021 | Zhou | ............... | H04W 74/0833 |
| 2021/0329677 A1* | 10/2021 | Huang | ............... | H04W 24/08 |
| 2022/0167267 A1 | 5/2022 | Ma et al. | | |
| 2022/0167413 A1* | 5/2022 | Myung | ............... | H04W 74/0816 |
| 2022/0174741 A1* | 6/2022 | Myung | ............... | H04W 72/0453 |
| 2023/0122848 A1* | 4/2023 | Kim | ............... | H04L 5/001 |
| | | | | 455/522 |

FOREIGN PATENT DOCUMENTS

| | | | |
|---|---|---|---|
| CN | 106851831 A | 6/2017 | |
| CN | 110381527 A | 10/2019 | |
| CN | 110603862 A | 12/2019 | |
| CN | 111 083 770 A | 4/2020 | |
| TW | 202130146 A | 8/2021 | |
| WO | WO 2012/019566 A1 | 2/2012 | |
| WO | WO 2019/013584 A1 | 1/2019 | |
| WO | WO 2019/139528 A1 | 7/2019 | |
| WO | 2019/193419 A2 | 10/2019 | |

OTHER PUBLICATIONS

Office Action for Taiwanese Application No. 112116183 dated Oct. 30, 2024, 3 pages.

Office Action for Argentina Application No. 20210101376 dated Nov. 5, 2024, 16 pages.

Examination Report for Australian Application No. 2020449037 dated Aug. 15, 2023, 4 pages.

Office Action for Japanese Application No. 2022-570603 dated Oct. 19, 2023, 10 pages.

Office Action for Saudi Arabian Application No. 522441385 dated Sep. 17, 2023, 15 pages.

"3rd Generation Partnership Project; Technical Specification Group Radio Access Network; NR; Medium Access Control (MAC) protocol specification (Release 16)", 3GPP TS 38.321 v16.0.0, (Mar. 2020), 141 pages.

"LS Response to Dormant BWP Configuration and Related Operation", 3GPP TSG RAN WG1 Meeting #100bis-e, R1-2003075, (Apr. 20-30, 2020), 2 pages.

First Examination Report for Indian Application No. 202227070630 dated Feb. 9, 2023, 7 pages.

International Search Report and Written Opinion for International Application No. PCT/CN2020/091438 dated Feb. 22, 2021, 9 pages.

LG Electronics Inc., "Summary of E-mail Discussion on [99bis#43][NR UP/MAC] Impact of BWP", 3GPP TSG-RAN WG2 Meeting #100, R2-1713879, (Nov. 27-Dec. 1, 2017), 35 pages.

Notice of Allowance for Taiwanese Application No. 110117940 dated Jan. 19, 2023, 3 pages.

Office Action for Bangladesh Application No. 163/2021/1935 dated May 30, 2022, 2 pages.

Office Action for Taiwanese Application No. 110117940 dated May 12, 2022, 19 pages.

Office Action for Vietnamese Application No. 1-2022-08333 dated Mar. 22, 2023, 2 pages.

OPPO et al., "Corrections on Dormant BWP Operation", 3GPP TSG-RAN WG2 Meeting #109bis-e, R2-2004183, Change Request 0733, (Apr. 20-30, 2020), 9 pages.

OPPO, "Email Report of [AT109bis-e][036][DCCA] Fast Scell Activation (OPPO)", R2-2004122, (Apr. 20-30, 2020), 20 pages.

Office Action for Algerian Application No. DZ/P/2022/0001038 dated Mar. 27, 2023, 2 pages.

Extended European Search Report for European Application No. 20936802.6 dated Feb. 8, 2024, 11 pages.

Office Action for Chilean Application No. 202203261 dated Jan. 19, 2024, 34 pages.

Examination Report for Australian Application No. 2020449037 dated Aug. 6, 2024, 3 pages.

Office Action for ARIPO Application No. AP/P/2022/014499 dated Jun. 12, 2024, 4 pages.

Office Action for Chilean Application No. 202203261 dated Jul. 23, 2024, 34 pages.

Office Action for Chinese Application No. 202080102708.1 dated Aug. 27, 2024, 9 pages.

Office Action for Taiwanese Application No. 112116183 dated Jun. 4, 2024, 8 pages.

Hearing Notice for Indian Application No. 202227070630 dated Sep. 8, 2024, 4 pages.

Office Action for Japanese Application No. 2022-570603 dated Jul. 8, 2024, 5 pages.

Office Action for Chinese Application No. 202080102708.1 dated Apr. 10, 2024, 18 pages.

Office Action for Canadian Application No. 3,179,469 dated Apr. 26, 2024, 4 pages.

Office Action for Saudi Arabian Application No. 522441385 dated Apr. 22, 2024, 14 pages.

Decision to Grant for ARIPO Application No. AP/P/2022/014499 dated Apr. 14, 2025, 5 pages.

Notice of Issuance for Chilean Application No. 2022-03261 dated Mar. 27, 2025, 2 pages.

Decision to Grant for Chinese Application No. 202080102708.1 dated Jan. 23, 2025, 6 pages.

LG Electronics Inc., "PHR for wider bandwidth operation", 3GPP TSG-RAN WG2 Meeting #99bis, R2-1711613, (Oct. 9-13, 2017), 4 pages.

Decision of Refusal for Japanese Application No. 2022-570603 dated Mar. 25, 2025, 6 pages.

Office Action for European Application No. 20936802.6 dated Jun. 2, 2025, 5 pages.

Office Action for Mexican Application No. MX/a/2022/014421 dated Jul. 18, 2025, 8 pages.

Office Action for Vietnamese Application No. 1-2022-08333 dated Jul. 25, 2025, 3 pages.

Examination Report for Australian Application No. 2024205786 dated Sep. 1, 2025, 3 pages.

Office Action for Singapore Application No. 11202260344Y dated Sep. 23, 2025, 9 pages.

Office Action for Colombian Application No. NC2022/0018359 dated Oct. 14, 2025, 22 pages.

Office Action for Canadian Application No. 3,179,469 dated Oct. 29, 2025, 3 pages.

Office Action for Korean Application No. 10-2022-7044611 dated Oct. 30, 2025, 18 pages.

Office Action for Mexican Application No. MX/a/2022/014421 dated Oct. 2, 2025, 8 pages.

\* cited by examiner

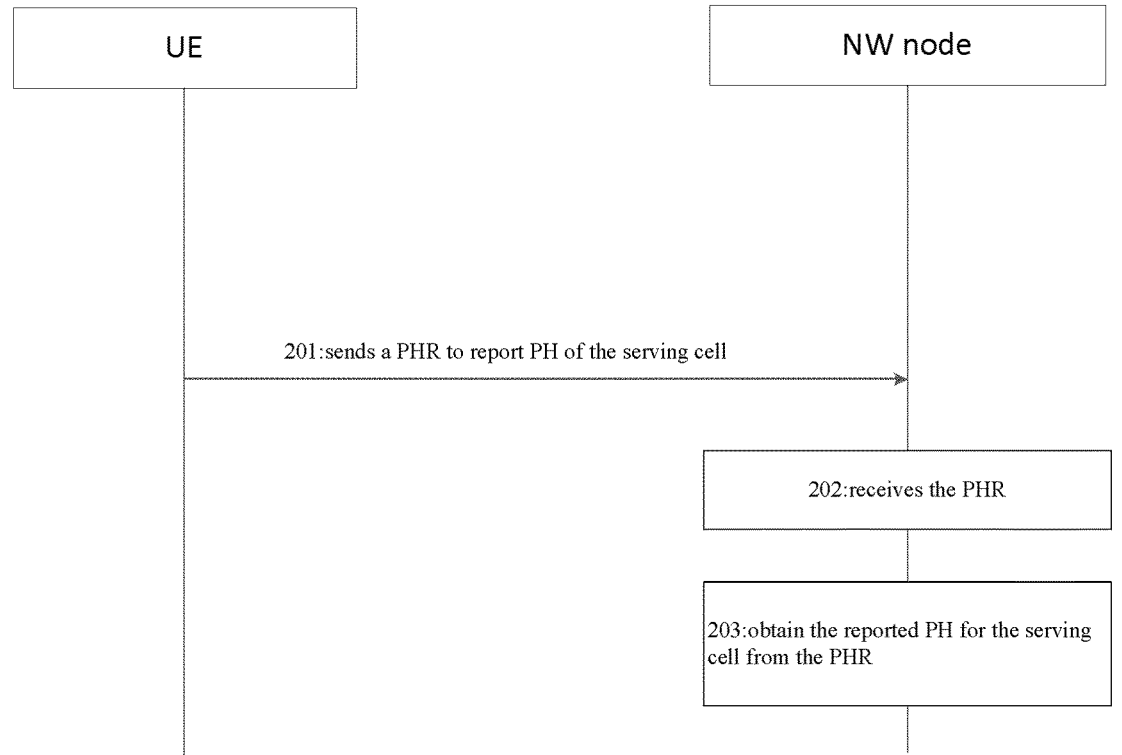
FIG.2a
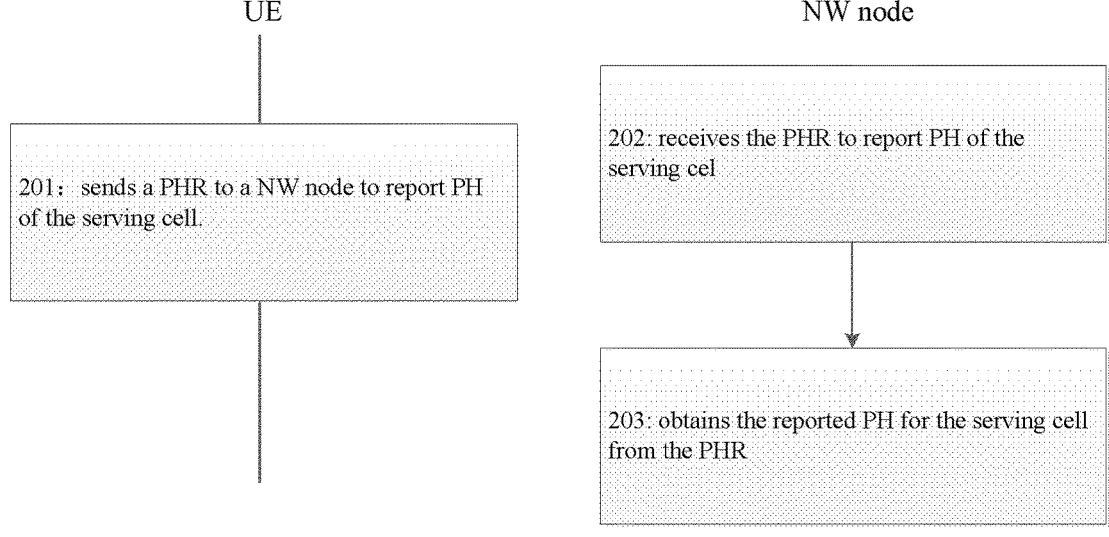
FIG. 2b                                    FIG.2c

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) | | | | | |
| R | R | $P_{CMAX,f,c}$ 1 | | | | | |
| P | V | PH (Type 1, PCell) | | | | | |
| R | R | $P_{CMAX,f,c}$ 2 | | | | | |
| P | V | PH (Type X, Serving Cell 1) | | | | | |
| D | R | $P_{CMAX,f,c}$ 3 | | | | | |

...

| P | V | PH (Type X, Serving Cell n) | | | | | |
|---|---|---|---|---|---|---|---|
| D | R | $P_{CMAX,f,c}$ m | | | | | |

FIG.3

| $C_7$ | $C_6$ | $C_5$ | $C_4$ | $C_3$ | $C_2$ | $C_1$ | R |
|-------|-------|-------|-------|-------|-------|-------|---|
| P | V | PH (Type 2, SpCell of the other MAC entity) | | | | | |
| R | R | $P_{CMAX,f,c}$ 1 | | | | | |
| P | V | PH (Type 1, PCell) | | | | | |
| R | R | $P_{CMAX,f,c}$ 2 | | | | | |
| P | V | PH (Type X, Serving Cell 1) | | | | | |
| D | R | $P_{CMAX,f,c}$ 3 | | | | | |

...

| P | V | PH (Type X, Serving Cell n) | | | | | |
|---|---|---|---|---|---|---|---|
| D | R | $P_{CMAX,f,c}$ m | | | | | |

FIG.4

POWER HEADROOM REPORT FOR A SERVING CELL

CROSS-REFERENCE TO RELATED APPLICATIONS

This application is a national phase entry of International Application No. PCT/CN2020/091438, filed May 20, 2020, the contents of which are hereby incorporated by reference in their entirety.

TECHNICAL FIELD

The teachings in accordance with example embodiments of present disclosure relate generally to wireless communication and, more specifically, relate to PHR for a serving cell.

BACKGROUND

This section is intended to provide a background or context to example embodiments of the present disclosure. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

A-CSI Aperiodic CSI
BFD Beam Failure Detection
BFR Beam Failure Recovery
BWP Bandwidth Part
CSI Channel State Information
DL-SCH Downlink Shared Channel
gNB 5G Node B/Base Station
HARQ Hybrid Automatic Repeat Request
LS Liaison Statements
LTE Long Term Evolution
MAC CE Medium Access Control Control Element
NR New Radio (5G)
NW Network
PCell Primary Cell
PDCCH Physical Downlink Control Channel
PH Power Headroom
PHR Power Headroom Report
P-SRS Periodic SRS
PSCell Primary Secondary Cell
PUCCH Physical Uplink Control Channel
RAN Radio Access Network
Rel Release
RRC Radio Resource Control
SCell Secondary Cell
SP/A-SRS Semi-persistent/Aperiodic-SRS
SpCell Special Cell (PCell/PSCell)
SRS Sounding Reference Signal
UE User Equipment
UL Uplink
UL-SCH Uplink Shared Channel In LTE, the so-called "dormant SCell state" was introduced in Rel-15 according to the following:

No PDCCH monitoring;
No UL transmissions;
Only periodic CSI reporting allowed via PCell.

The introduction of this state was to allow power saving while also having faster activation of SCells than with deactivated SCells.

In NR, a similar concept was introduced via a "Dormant BWP" introduced in Rel-16 [TS 38.321 from e R2-2004183].

1> if a BWP is activated and it is dormant BWP:
  2> stop the bwp-Inandorsed CRctivityTimer of this Serving Cell, if running.
  2> not monitor the PDCCH on the BWP;
  2> not monitor the PDCCH for the BWP;
  2> not receive DL-SCH on the BWP;
  2> perform CSI measurement for the BWP, if configured;
  2> not transmit SRS on the BWP;
  2> not transmit on UL-SCH on the BWP;
  2> not transmit PUCCH on the BWP.
  2> clear any configured downlink assignment and any configured uplink grant Type 2 associated with the SCell respectively;
  2> suspend any configured uplink grant Type 1 associated with the SCell;
  2> if configured, perform beam failure detection and beam failure recovery for the SCell if beam failure is detected.

SUMMARY

The scope of protection sought for various embodiments of the present disclosure is set out by the independent claims. The embodiments and features, if any, described in this specification that do not fall under the scope of the independent claims are to be interpreted as examples useful for understanding various embodiments of the present disclosure.

According to a first aspect, various embodiments provide a method for PHR for a serving cell, wherein an active BWP of the serving cell is a dormant BWP. A UE sends a PHR to a network node to report PH of the serving cell; wherein at least one of the following is reported for the serving cell:
  Type 1 PH;
  Type 3 PH;
  a designated field indicating whether the PH is Type 1 or Type 3;
  a designated field indicating whether the serving cell is on a dormant BWP or non-dormant BWP.

According to a second aspect, various embodiments provide a method for PHR for a serving cell, wherein an active BWP of the serving cell is a dormant BWP. A NW node receives a PHR from a UE to report PH of the serving cell and obtains PH value for the serving cell from the PHR. Herein, at least one of the following is reported for the serving cell:
  Type 1 PH;
  Type 3 PH;
  a designated field indicating whether the PH is Type 1 or Type 3;
  a designated field indicating whether the serving cell is on a dormant BWP or non-dormant BWP.

According to a third aspect, various embodiments provide a method for PHR for a serving cell. A UE sends a PHR to a network node to report PH of the serving cell when the PHR is triggered upon a switching event that an active BWP on the serving cell switching from a dormant BWP to a non-dormant BWP or that the active BWP on the serving cell switching from a non-dormant BWP to a dormant BWP.

According to a fourth aspect, various embodiments provide a method for PHR for a serving cell, wherein an active BWP of the serving cell is a dormant BWP. A UE sends a PHR to at least a network node to report PH of the serving cell; the network node receives the PHR from the UE to report PH of the serving cell and obtains PH value from the PHR for the serving cell. Herein at least one of the following is reported for the serving cell:

Type 1 PH;

Type 3 PH;

a designated field indicating whether the PH is Type 1 or Type 3;

a designated field indicating whether the serving cell is on a dormant BWP or non-dormant BWP.

According to a fifth aspect, various embodiments provide a UE for PHR for a serving cell, wherein an active BWP of the serving cell is a dormant BWP. The UE comprises at least one processor and at least one memory including computer program code. The at least one memory and the computer program code configured to, with the at least one processor, cause the UE at least to perform sending a PHR to a network node to report Power Headroom (PH) of the serving cell. Herein at least one of the following is reported for the serving cell:

Type 1 PH;

Type 3 PH;

a designated field indicating whether the PH is Type 1 or Type 3;

a designated field indicating whether the serving cell is on a dormant BWP or non-dormant BWP.

According to a sixth aspect, various embodiments provide a network node for PHR for a serving cell, wherein an active BWP of the serving cell is a dormant BWP. The NW node comprises at least one processor and at least one memory including computer program code. The at least one memory and the computer program code configured to, with the at least one processor, cause the network node at least to perform receiving a PHR from a UE to report PH of the serving cell and obtaining PH value for the serving cell from the PHR. Herein at least one of the following is reported for the serving cell:

Type 1 PH;

Type 3 PH;

a designated field indicating whether the PH is Type 1 or Type 3;

a designated field indicating whether the serving cell is on a dormant BWP or non-dormant BWP.

According to a seventh aspect, various embodiments provide a UE for PHR for a serving cell. The UE comprises at least one processor and at least one memory including computer program code. The at least one memory and the computer program code configured to, with the at least one processor, cause the UE at least to perform sending a PHR to a network node to report PH of the serving cell when the PHR is triggered upon a switching event that active BWP on the serving cell switching from a dormant BWP to a non-dormant BWP or that the active BWP on the serving cell switching from a non-dormant BWP to a dormant BWP.

According to an eighth aspect, various embodiments provide a system for PHR for a serving cell, wherein an active BWP of the serving cell is a dormant BWP. The system comprises a UE and at least a network node. The UE comprises at least one first processor and at least one first memory including first computer program code. The at least one memory and the computer program code configured to, with the at least one processor, cause the UE at least to perform sending a PHR to the network node to report PH of the serving cell. The network node comprises at least one second processor and at least one second memory including second computer program code. The at least one memory and the computer program code configured to, with the at least one processor, cause the network node at least to perform receiving the PHR from the UE to report PH of the serving cell and obtaining PH value for the serving cell, from the PHR. Herein at least one of the following is reported for the serving cell:

Type 1 PH;

Type 3 PH;

a designated field indicating whether the PH is Type 1 or Type 3;

a designated field indicating whether the serving cell is on a dormant BWP or non-dormant BWP.

According to some embodiments, the reported PH is Type 1 PH with virtual field indicating a PUSCH reference format is used.

According to some embodiments, the reported PH is Type 3 PH depending on whether there is SRS transmission on the dormant BWP when the PHR is reported.

According to some embodiments, the PHR is triggered upon a switching event that the active BWP on the serving cell switching from a dormant BWP to a non-dormant BWP or that the active BWP on the serving cell switching from a non-dormant BWP to a dormant BWP.

According to some embodiments, the PHR triggering is upon switching the active BWP from a dormant BWP to a non-dormant BWP if no PHR is reported for the serving cell when the active BWP is a dormant BWP. Further, the UE continues downlink Reference Signals measurements for PH calculation without reporting to the network node, till the PHR is triggered after the active BWP switches from a dormant BWP to a non-dormant BWP. And the trigger of PHR is made on a per serving cell when the active BWP is a dormant BWP. The trigger of PHR is configured by the network node.

According to some embodiments, the PHR triggering upon activation of the serving cell when the first active BWP of the serving cell is not a dormant BWP. And the trigger of PHR is made on a per serving cell when the active BWP is a dormant BWP. The trigger of PHR is configured by the network node.

According to some embodiments, the UE is configured with dual connectivity with serving cells served with two network nodes, and the network node to which the UE sends the PHR is one of the two network nodes.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of embodiments of the disclosure and are not necessarily drawn to scale, in which:

FIG. 2a shows a method that may be performed by apparatuses in accordance with some example embodiments of the present disclosure; FIGS. 2b and 2c show examples of a method that may be performed by a UE and a network node, respectively in accordance with some example embodiments of the present disclosure;

FIG. 3 shows an example of Table 6.1.3.9-1 demonstrating Multiple Entry PHR MAC CE with the highest Serv-CellIndex of Serving Cell with configured uplink is less than 8 in accordance with some example embodiments of the present disclosure; and FIG. 4 shows an example of Table 6.1.3.9-1 demonstrating Multiple Entry PHR MAC CE with the highest Serv-CellIndex of Serving Cell with configured uplink is equal to or higher than 8 in accordance with some example embodiments of the present disclosure.

DETAILED EMBODIMENTS

Figure 1:
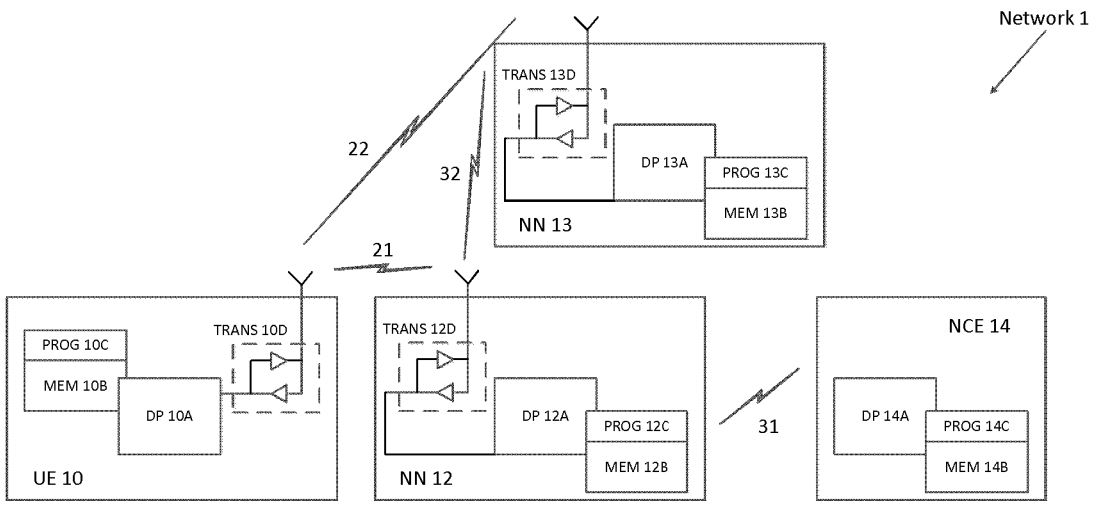
FIG. 1 shows a high level block diagram of various devices used in carrying out some example embodiments of the present disclosure.

Principle of the present disclosure will now be described with reference to some example embodiments. It is to be understood that these example embodiments are described only for the purpose of illustration and for helping those skilled in the art to understand and implement the present disclosure, without suggesting any limitation as to the scope of the disclosure. The embodiments described herein can be implemented in various manners which are not limited to the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to a network node on predetermined schedules, when triggered by an internal or external event, or in response to requests from the network side.

Examples of the UE include, but are not limited to, user equipment (UE) such as smart phones, wireless-enabled tablet computers, laptop-embedded equipment (LEE), laptop-mounted equipment (LME), wireless customer-premises equipment (CPE), sensors, metering devices, personal wearables such as watches etc., and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network node" refers to a device via which services can be provided to a terminal device in a communication network. The network node may comprise an access network node and a core network node. The access network node may comprise any suitable device via which a terminal device or UE can access the communication network. Examples of the access network nodes include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

The communication system and associated devices (e.g., UE and network nodes) typically operate in accordance with a given standard or specification which sets out what various entities associated with the system are permitted to do and how that should be achieved. Communication protocols and/or parameters which shall be used for the connection are also typically defined. One example of a communications system long-term evolution (LTE) of the Universal Mobile Telecommunications System (UMTS) radio-access technology and so-called 5G or New Radio (NR) networks.

Before describing the example embodiments of the present disclosure in detail, reference is made to FIG. 1 for illustrating a simplified block diagram of various electronic devices that are suitable for use in practicing some example embodiments of this present disclosure.

FIG. 1 shows a block diagram of one possible and non-limiting example system in which some example embodiments of the present disclosure may be practiced. In FIG. 1, a UE 10 is in wireless communication with a wireless network 1. A UE is a wireless, typically mobile device that can access a wireless network. The UE 10 may include one or more processors DP 10A, one or more memories MEM 10B, and one or more transceivers TRANS 10D interconnected, e.g., through one or more buses. Each of the one or more transceivers TRANS 10D may include a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D may be connected to one or more antennas for communication 21 and 22 to NN 12 and NN 13, respectively. The one or more memories MEM 10B include computer program code PROG 10C. The UE 10 may communicate with NN 12 and/or NN 13 via a wireless link.

The NN 12 (which may be a NR/5G Node B, an evolved NB, or LTE device) is a network node such as a master or secondary node base station (e.g., for NR or LTE) that communicates with devices such as NN 13 and/or UE 10 of FIG. 1. The NN 12 may provide access to wireless devices such as the UE 10 to the wireless network 1. The NN 12 may include one or more processors DP 12A, one or more memories MEM 12C, and one or more transceivers TRANS 12D interconnected, e.g., through one or more buses. In accordance with some example embodiments, these TRANS 12D may include X2 and/or Xn interfaces for use to perform some example embodiments of the present disclosure. Each of the one or more transceivers TRANS 12D may include a receiver and a transmitter. The one or more transceivers TRANS 12D may be connected to one or more antennas, e.g., for communication over at least a link 21 with the UE 10. The one or more memories MEM 12B and the computer program code PROG 12C may be configured, with the one or more processors DP 12A, to cause the NN 12 to perform one or more of the operations as described herein. The NN 12 may communicate with another network node, e.g., a gNB or eNB, or a device such as the NN 13. Further, the link 21 and or any other link may be wired or wireless or both and may implement, e.g., an X2 or Xn interface. Further the link 21 may be through other network nodes such as, but not limited to an NCE/MME/SGW device such as the NCE 14 of FIG. 1.

In some embodiments, the NN 13 may comprise a mobility function device such as an AMF or SMF. In some embodiments, the NN 13 may comprise a NR/5G Node B (also referred to as gNB) or possibly an evolved NB (eNB) which may be a master or secondary node base station (e.g., for NR or LTE) that communicates with devices such as the NN 12 and/or UE 10 and/or the wireless network 1. The NN 13 may include one or more processors DP 13A, one or more memories MEM 13B, one or more network interfaces, and one or more transceivers TRANS 12D interconnected, e.g., through one or more buses. In accordance with some example embodiments, these network interfaces of NN 13 may include X2 and/or Xn interfaces for use to perform some example embodiments of the present disclosure. Each of the one or more transceivers TRANS 13D may include a receiver and a transmitter connected to one or more antennas. The one or more memories MEM 13B may include computer program code PROG 13C. For instance, the one or more memories MEM 13B and the computer program code PROG 13C may be configured, with the one or more processors DP 13A, to cause the NN 13 to perform one or more of the operations as described herein. The NN 13 may communicate with another mobility function device and/or gNB such as the NN 12 using e.g., link 32, and may communicate with the UE 10 or any other device using, e.g., link 22 or another link. These links maybe wired or wireless or both and may implement, e.g., an X2 or Xn interface. Further, the link 22 may be through other network nodes such as, but not limited to an NCE/MME/SGW device such as the NCE 14 of FIG. 1.

The one or more buses of the device of FIG. 1 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses may be implemented in part as fiber optic cable to connect the other elements of the NN 12 to a RRH.

It is noted that although FIG. 1 shows network nodes such as NN 12 and NN 13, any of these nodes may incorporate or be incorporated into an eNB or gNB, and would still be configurable to perform example embodiments of the present disclosure.

It is also noted that description herein indicates that "cells" perform some functions, but it should be clear that a network node (e.g., an eNB or gNB) which provides the cell performs the functions, facilitated with a user equipment and/or a mobility management function device in some cases. In addition, the cell makes up part of a gNB, and there can be multiple cells per gNB.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The NN 12 and the NN 13 may be coupled via a link 31 and/or link 32 to the NCE 14. In addition, it is noted that operations in accordance with some example embodiments, as performed by the NN 13, may also be performed at the NCE 14.

The NCE 14 may include one or more processors DP 14A, one or more memories MEM 14B, and one or more network interfaces (N/W I/F(s)), interconnected, e.g., through one or more buses coupled with the link 13 and/or 14. In accordance with some example embodiments, these network interfaces may include X2 and/or Xn interfaces for use to perform some example embodiments of the present disclosure. The one or more memories MEM 14B may include computer program code PROG 14C. The one or more memories MEM 14B and the computer program code PROG 14C may be configured to, with the one or more processors DP 14A, cause the NCE 14 to perform one or more operations which may be needed to support the operations in accordance with some example embodiments of the present disclosure.

The wireless network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

An LS was sent from RAN2 to RAN1 asking if they see any issue with not support aperiodic CSI reporting for dormant BWP and not support SRS transmission on dormant BWP. The following was replied from RAN1 (R1-2003075): RAN1 could not reach a consensus on the support of A-CSI measurement in dormant BWP (with report triggered by another cell e.g. PCell) or SP/A-SRS transmission in dormant BWP. RAN1 sees no issue with supporting at least long periodicity P-SRS, e.g. >100 ms.

RAN1 reply LS in R1-2003075 reverted previous RAN2 assumption of no periodic SRS transmissions when the UE is on a dormant DL BWP (with potentially also A-CSI, but this was not clear yet). The issue needs to be resolved in RAN2.

The following agreements have been made in RAN2 with the assumption of no UL transmission when the DL is on a dormant BWP.

No UL dormant BWP is defined, and the UL behaviour is specified in TS38.321 in case the DL BWP is switched to dormant BWP.

RAN2 confirm that UE do not switch UL BWP (for FDD) as a result of transition from dormancy to non-dormancy or vice versa (no change to today, with regard to BWP switching).

The activated SCell on which the active BWP is dormant BWP should not be included in PHR report. For further study, whether addition/modification to PHR trigger is needed.

The PHR triggers are currently defined in TS 38.321 and the specification does not yet reflect the agreement that PHR is not reported for dormant BWP.

No discussion about how PHR works. It also needs to be discussed if PHR is needed now that the UE starts performing SRS transmission. The NW node needs to know PH value of the serving cell.

Further, with dual connectivity, it would be problematic if the PHR content depends on whether the UE is a dormant BWP or non-dormant BWP since the other NW node does not know which BWP the UE is on for the cells from the other node, and the bitmap in the PHR only indicate if PH for a cell is reported or not (the cell is activated or not) and the virtual bit only indicates if the PH is real or virtual.

The other NW node cannot determine whether the PH is for Type 1 for PUSCH in non-dormant case or Type 3 for SRS transmissions in dormant case.

Now referring to FIGS. 2a-2c which show examples of a method for PHR for a serving cell according to some example embodiments of the present disclosure. FIG. 2a shows interactions between a UE and a NW node, while FIGS. 2b and 2c show operations performed at the UE and the NW node respectively.

At step 201, a UE sends a PHR to a NW node to report PH of the serving cell. Herein, the reported PH is indicated by one of the following:

1) Type 1 PH;

2) Type 3 PH;

3) a designated field indicating whether the PH is Type 1 or Type 3;

4) a designated field indicating whether the serving cell is on a dormant Bandwidth Part (BWP) or non-dormant BWP.

In some embodiments, the reported PH for the serving cell may be Type 1 PH. The UE may always report Type 1 PH for the cells when the active BWP for the serving cell is a dormant BWP. In the PHR, a virtual field (V field) is used to indicate if the PH value is based on a real transmission or a reference format. For Type 1 PH, the V field set to 0 indicates real transmission on PUSCH and the V field set to 1 indicates that a PUSCH reference format is used. In some embodiments, only virtual Type 1 PH is reported for the serving cell since there is no PUSCH transmission when DL active BWP is a dormant BWP. In other words, whenever the V bit indicates a virtual PHR, the NW knows it is Type 1 without ambiguity.

Type 1 virtual PH of the serving cell is reported based on reference PUSCH of the dormant UL BWP or active UL BWP in case there is no definition of dormant UL BWP.

In some embodiments, the reported PH for the serving cell may be Type 3 PH. The UE may always report Type 3 for the dormant SCell or the serving cell with active DL BWP on a dormant BWP when the SRS is configured to be transmitted in case of dormancy. Depending on whether there is SRS transmission on the dormant BWP when the PHR is reported, real/virtual Type 3 PH is used for reporting. When the PHR is reported, at the time SRS transmission on dormant BWP happens, real Type 3 PH is included in the PHR. When the PHR is reported and there is no SRS transmission on dormant BWP, virtual Type 3 PH is included in the PHR.

In some embodiments, a designated field in the PHR may be used for indicating whether the PH is Type 1 or Type 3. In an example embodiment of the present disclosure, in case real SRS transmission happens when the PHR is reported, Type 3 real PH is reported while in case no transmission happens in the dormant BWP, virtual Type 1 PH could be reported.

With reference to FIG. 3, it shows an example of Multiple Entry PHR MAC CE with the highest ServCellIndex of Serving Cell with configured uplink is less than 8. A previously reserved field is designated as a "D" field to indicate if the PH is Type 1 or Type 3. The V field is always set to 1 when the active BWP of this Serving Cell is dormant BWP if Type 1 PH is reported.

In some embodiments, a designated field in the PHR may be used for indicating whether the serving cell is on a dormant BWP or non-dormant BWP. In an example embodiment of the present disclosure, a reserved bit in the PHR may be redefined for such indication, then the NW node would know the UE is on a dormant BWP or not and whether Type 1 or Type 3 PH is reported.

With reference to FIG. 3 again, a previously reserved field is designated as a "D" field to indicate if the PH value is based on a dormant BWP or a non-dormant BWP transmission. The V field is always set to 1 when the active BWP of this Serving Cell is dormant BWP if type 1 PH is reported.

In some embodiments, the PHR may be triggered on the events defined in TS 38.321. In other embodiments, a new trigger event is introduced for the triggering of PHR. In an example embodiment of the present disclosure, the new trigger event may be a switching event of the active BWP on the serving cell, when the active BWP switches from a dormant BWP to a non-dormant BWP or the active BWP switches from a non-dormant BWP to a dormant BWP, PHR for the serving cell is triggered.

Furthermore, in some embodiments, the triggering is upon switching the active BWP from a dormant BWP to a non-dormant BWP if no PHR is reported for the serving cell when the active BWP was a dormant BWP. In an example embodiment of the present disclosure, UE triggers PHR upon activating non-dormant BWP when the dormant BWP was the previously activated BWP. And such trigger may be further subject to whether PH for the dormant SCell is reported, e.g., due to SRS transmissions. For example, if no PHR is reported for the SCell in dormant state, the PHR is triggered upon activating non-dormant BWP after the dormant BWP was the previously activated BWP.

In some embodiments, the PHR triggering upon activation of a serving cell may be limited to the case when the first active BWP of the serving cell is not a dormant BWP. In other words, for example in case the first active BWP of a serving cell to be activated is a dormant BWP, the UE may not trigger PHR. For example, in case the first active BWP of a serving cell to be activated is not a dormant BWP, the UE may trigger PHR. In some examples, the serving cell may be activated by the NW node by means of MAC CE, for example, SCell Activation/Deactivation MAC CE, or by means of RRC signaling.

In some embodiments, before the step 201, the UE continues downlink Reference Signals measurements for PH calculation without reporting to the NW node, till the PHR is triggered after the active BWP switches from a dormant BWP to a non-dormant BWP. In an example embodiment of the present disclosure, UE continues DL RS measurements for Power Headroom (PH) calculation but does not report the given SCell while in dormant BWP. If during dormant BWP being active a PHR was triggered, then UE would send a report to NW after moving to non-dormant BWP.

In some embodiments, the PHR is further prohibited for a predefined time. In an example embodiment of the present disclosure, the PHR reports as in the above embodiments may also be restricted by the phr-ProhibitTimer. This allows NW to restrict too frequent PHR report in case the SCell is put to dormant BWP only for a short while.

In some embodiments, the trigger of PHR is configured by the NW node. In an example embodiment of the present disclosure, NW node may configure if the UE shall trigger PHR upon moving from dormant BWP to non-dormant BWP. Further, such a configuration could be made on a per SCell with dormant BWP configured.

In some embodiments, UE is configured with dual connectivity with serving cells served with two NW nodes. To avoid type 1/type 3 PHR reporting ambiguity for the other node (MN or SN) since the other node (SN or MN, respectively) is not aware of which BWP the UE is using (dormant or non-dormant BWP), the PHR procedure for report PH of the serving cells on which the active BWP is a dormant BWP according to embodiments of present disclosure.

Referring back to FIGS. 2b-2c, at step 202, the NW node receives the PHR to report PH of the serving cell; then at step 203, the NW node obtain the reported PH for the serving cell from the PHR.

In some embodiments, NW node may decode the reported PH when PH is always Type 1 PH or Type 3 PH. In other embodiments, NW node may decode the reported PH according to the indication in the designated field which indicates the reported PH is Type 1 or Type 3 or whether the serving cell is on a dormant BWP or non-dormant BWP.

In the below, Example of Specification changes based on TS 38.321 required for the option of new trigger for PHR in case of moving from dormant to non-dormant BWP is described in detail. The changes to Specification are made on three sections: i.e., Power Headroom Reporting (Section 5.4.6), Bandwidth Part (BWP) operation (Section 5.15) and Multiple Entry PHR MAC CE (Section 6.1.3.9).

Power Headroom Reporting (Section 5.4.6)

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell.

RRC controls Power Headroom reporting by configuring the following parameters:

phr-PeriodicTimer;
phr-ProhibitTimer;
phr-Tx-PowerFactorChange;
phr-Type2OtherCell;
phr-ModeOtherCG;
multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-PeriodicTimer expires;

upon configuration or reconfiguration of the power headroom reporting functionality by upper layers, which is not used to disable the function;

activation of an SCell of any MAC entity with configured uplink if the first BWP is not a dormant BWP;

(addition according to some embodiment introduced by the present disclosure.)

addition of the PSCell (i.e. PSCell is newly added or changed);

upon switching the active BWP from the dormant BWP to a non-dormant BWP (as specified in clause 5.15);

(This is trigger event is a new event introduced by the present disclosure to trigger PHR for serving cell.)

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPR, as specified in TS 38.101-1 [14], TS 38.101-2 [15], and TS 38.101-3 [16]) for this cell has changed more than phr-x-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

If the MAC entity has UL resources allocated for a new transmission the MAC entity shall:

1> if it is the first UL resource allocated for a new transmission since the last MAC reset:

2> start phr-PeriodicTimer;

1> if the Power Headroom reporting procedure determines that at least one PHR has been triggered and not cancelled; and 1> if the allocated UL resources can accommodate the MAC CE for PHR which the MAC entity is configured to transmit, plus its subheader, as a result of LCP as defined in clause 5.4.3.1:

2> if multiplePHR with value true is configured:

3> for each activated Serving Cell with configured uplink associated with any MAC entity and its active BWP is not dormant BWP:

4> obtain the value of the Type 1 or Type 3 power headroom for the corresponding uplink carrier as specified in clause 7.7 of TS 38.213 [6];

4> if this MAC entity has UL resources allocated for transmission on this Serving Cell; or 4> if the other MAC entity, if configured, has UL resources allocated for transmission on this Serving Cell and phr-ModeOtherCG is set to real by upper layers:

5> obtain the value for the corresponding $P_{CMAX,f,c}$ field from the physical layer.

3> for each activated Serving Cell with configured uplink associated with any MAC entity and its active BWP is dormant BWP for which SRS is configured:

4> obtain the value of the virtual Type 1 power headroom for the corresponding uplink carrier as specified in clause 7.7 of TS 38.213 [6]; (NW node obtains the value of virtual Type 1 PH for the active BWP being dormant BWP with SRS configured. Addition according to some embodiment introduced by the present disclosure.)

4> if this MAC entity has SRS resources allocated for transmission on this Serving Cell when the PHR is reported:

5> obtain the value of the of the real Type 3 power headroom for the corresponding uplink carrier as specified in clause 7.7 of TS 38.213 [6];

4> else:

5> obtain the value of the of the virtual Type 1 power headroom for the corresponding uplink carrier as specified in clause 7.7 of TS 38.213 [6];

(NW node obtains the value of real Type 3 for the active BWP being dormant BWP with SRS transmission when the PHR is reported, or obtains the value of virtual Type 1 PH for the active BWP being dormant BWP with SRS configured. Addition according to some embodiment introduced by the present disclosure.)

3> if phr-Type2OtherCell with value true is configured:

4> if the other MAC entity is E-UTRA MAC entity:

5> obtain the value of the Type 2 power headroom for the SpCell of the other MAC entity (i.e. E-UTRA MAC entity);

5> ifphr-ModeOtherCG is set to real by upper layers:

6> obtain the value for the corresponding $P_{CMAX,f,c}$ field for the SpC ell of the other MAC entity (i.e. E-UTRA MAC entity) from the physical layer.

3> instruct the Multiplexing and Assembly procedure to generate and transmit the Multiple Entry PHR MAC CE as defined in clause 6.1.3.9 based on the values reported by the physical layer.

2> else (i.e. Single Entry PHR format is used):

3> obtain the value of the Type 1 power headroom from the physical layer for the corresponding uplink carrier of the PCell;

3> obtain the value for the corresponding $P_{CMAX,f,c}$ field from the physical layer;

3> instruct the Multiplexing and Assembly procedure to generate and transmit the Single Entry PHR MAC CE as defined in clause 6.1.3.8 based on the values reported by the physical layer.

2> start or restart phr-PeriodicTimer;

2> start or restart phr-ProhibitTimer;

2> cancel all triggered PHR(s).

Bandwidth Part (BWP) operation (Section 5.15)

Downlink and Uplink (Section 5.15.1)

In addition to clause 12 of TS 38.213 [6], this clause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-Inactivity Timer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

For each SCell a dormant BWP may be configured with dormantDownlinkBWP-Id by RRC signalling as described in TS 38.331 [5]. Entering or leaving dormant BWP for SCells is done by BWP switching per SCell or per dormancy SCell group with PDCCH (as specified in TS 38.213 [6]). The dormancy SCell group configurations indicated by dormancySCellGroups are configured by RRC signalling as described in TS 38.331 [5]. Upon reception of the PDCCH indicating leaving dormant BWP, the DL BWP indicated by firstOutsideActiveTimeBWP-Id or by firstWithinActiveTimeBWP-Id (as specified in TS 38.331 [5] and TS 38.213 [6]) is activated. The dormant BWP configuration for SpCell or PUCCH SCell is not supported.

For each activated Serving Cell configured with a BWP, the MAC entity shall:

1> if a BWP is activated and it is not the dormant BWP:

2> transmit on UL-SCH on the BWP;

2> transmit on RACH on the BWP, if PRACH occasions are configured;

2> monitor the PDCCH on the BWP;

2> transmit PUCCH on the BWP, if configured;

2> report CSI for the BWP;

2> transmit SRS on the BWP, if configured;

2> receive DL-SCH on the BWP;

2> if the previously active BWP was the dormant BWP:

3> trigger PHR according to clause 5.4.6.

(UE triggers PHR upon the active BWP switching from the dormant BWP to a non-dormant BWP. Addition according to some embodiment introduced by the present disclosure.)

2> (re-)initialize any suspended configured uplink grants of configured grant Type 1 on the active BWP according to the stored configuration, if any, and to start in the symbol according to rules in clause 5.8.2;

2> if consistent LBT failure recovery is configured:

3> stop the lbt-FailureDetectionTimer, if running;

3> set LBT COUNTER to 0;

3> monitor LBT failure indications from lower layers as specified in clause 5.21.2.

1> if a BWP is activated and it is dormant BWP:

2> stop the bwp-Inactivity Timer of this Serving Cell, if running.

2> not monitor the PDCCH on the BWP;

2> not monitor the PDCCH for the BWP;

2> not receive DL-SCH on the BWP;

2> perform CSI measurement for the BWP, if configured;

2> not transmit SRS on the BWP;

2> not transmit on UL-SCH on the BWP;

2> not transmit PUCCH on the BWP.

2> clear any configured downlink assignment and any configured uplink grant Type 2 associated with the SCell respectively;

2> suspend any configured uplink grant Type 1 associated with the SCell;

2> if configured, perform beam failure detection and beam failure recovery for the SCell if beam failure is detected.

1> if a BWP is deactivated:

2> not transmit on UL-SCH on the BWP;

2> not transmit on RACH on the BWP;

2> not monitor the PDCCH on the BWP;

2> not transmit PUCCH on the BWP;

2> not report CSI for the BWP;

2> not transmit SRS on the BWP;

2> not receive DL-SCH on the BWP;

2> clear any configured downlink assignment and configured uplink grant of configured grant Type 2 on the BWP;

2> suspend any configured uplink grant of configured grant Type 1 on the inactive BWP.

Upon initiation of the Random Access procedure on a Serving Cell, after the selection of carrier for performing Random Access procedure as specified in clause 5.1.1, the MAC entity shall for the selected carrier of this Serving Cell:

1> if PRACH occasions are not configured for the active UL BWP:

2> switch the active UL BWP to BWP indicated by initialUplinkBWP;

2> if the Serving Cell is an SpCell:

3> switch the active DL BWP to BWP indicated by initialDownlinkBWP.

1> else:

2> if the Serving Cell is an SpCell:

3> if the active DL BWP does not have the same bwp-Id as the active UL BWP:

4> switch the active DL BWP to the DL BWP with the same bwp-Id as the active UL BWP.

1> stop the bwp-InactivityTimer associated with the active DL BWP of this Serving Cell, if running.

1> if the Serving Cell is SCell:

2> stop the bwp-InactivityTimer associated with the active DL BWP of SpCell, if running.

1> perform the Random Access procedure on the active DL BWP of SpCell and active UL BWP of this Serving Cell.

If the MAC entity receives a PDCCH for BWP switching of a Serving Cell, the MAC entity shall:

1> if there is no ongoing Random Access procedure associated with this Serving Cell; or 1> if the ongoing Random Access procedure associated with this Serving Cell is successfully completed upon reception of this PDCCH addressed to C-RNTI (as specified in clauses 5.1.4, 5.1.4a, and 5.1.5):

2> cancel, if any, triggered consistent LBT failure for this Serving Cell;

2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

Upon reception of RRC (re-)configuration for BWP switching for a Serving Cell, cancel any triggered LBT failure in this Serving Cell.

The MAC entity shall for each activated Serving Cell configured with bwp-Inactivity Timer:

1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or 1> if the defaultDownlinkBWP-Id is not configured, and the active DL BWP is not the initialDownlinkBWP, and the active DL BWP is not the BWP indicated by the dormantDownlinkBWP-Id if configured:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant or received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI (as specified in clauses 5.1.4, 5.1.4a and 5.1.5):

4> start or restart the bwp-InactivityTimer associated with the active DL BWP.

2> if the bwp-Inactivity Timer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

NOTE: If a Random Access procedure is initiated on an SCell, both this SCell and the SpCell are associated with this Random Access procedure.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantDownlinkBWP-Id if configured; or 2> if the defaultDownlinkBWP-Id is not configured, and the MAC entity switches to the DL BWP which is not the initialDownlinkBWP and is not indicated by the dormantDownlinkBWP-Id if configured:

3> start or restart the bwp-InactivityTimer associated with the active DL BWP.

Multiple Entry PHR MAC CE (Section 6.1.3.9)

The Multiple Entry PHR MAC CE is identified by a MAC subheader with LCD as specified in Table 6.2.1-2.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and PCMAX,f,c field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

Ci: This field indicates the presence of a PH field for the Serving Cell with ServCellIndex i as specified in TS 38.331 [5]. The Ci field set to 1 indicates that a PH field for the Serving Cell with ServCellIndex i is reported. The Ci field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field, and the V field set to 1 indicates that the octet containing the associated $P_{CMAX,f,c}$ field is omitted;

Power Headroom (PH): This field indicates the power headroom level. The length of the field is 6 bits. The reported PH and the corresponding power headroom levels are shown in FIG. 3 of Table 6.1.3.9-1 (the corresponding measured values in dB for the NR Serving Cell are specified in TS 38.133 [11] while the corresponding measured values in dB for the E-UTRA Serving Cell are specified in TS 36.133 [12]);

P: This field indicates whether the MAC entity applies power backoff due to power management (as allowed by P-MPRc as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$:If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in FIG. 4 of Table 6.1.3.9-2 (the corresponding measured values in dBm for the NR Serving Cell are specified in TS 38.133 [11] while the corresponding measured values in dBm for the E-UTRA Serving Cell are specified in TS 36.133 [12]).

D: If present, this field indicates if the PH value is based on a dormant BWP or a non-dormant BWP transmission.

(D field is a designated field for indicating the serving cell is on a dormant BWP or non-dormant BWP. Addition according to some embodiment introduced by the present disclosure.)

In general, various embodiments may be implemented in hardware or special purpose circuitry, software, logic or any combination thereof. For example, some aspects may be implemented in hardware, while other aspects may be implemented in firmware or software which may be executed by a controller, microprocessor or other computing device, although the present disclosure is not limited thereto. While various aspects of the present disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As used in this disclosure, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in the present disclosure, including in any claims. As a further example, as used in the present disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The word "example" is used herein to mean "serving as an example, instance, or illustration." Any embodiment described herein as "example" is not necessarily to be construed as preferred or advantageous over other embodiments. All of the embodiments described in this Detailed Description are example embodiments provided to enable persons skilled in the art to make or use the present disclosure and not to limit the scope of the present disclosure which is defined by the claims.

The foregoing description has provided by way of example and non-limiting examples a full and informative description of the best method and apparatus presently contemplated by the inventors for carrying out the present disclosure. However, various modifications and adaptations may become apparent to those skilled in the relevant arts in view of the foregoing description, when read in conjunction with the accompanying drawings and the appended claims. However, all such and similar modifications of the teachings of this present disclosure will still fall within the scope of this present disclosure.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of some example embodiments of this present disclosure could be used to advantage without the corresponding use of other features. As such, the foregoing description should be considered as merely illustrative of the principles of the present disclosure, and not in limitation thereof.

The invention claimed is:

1. A user equipment (UE) for a Power Headroom Report (PHR) for a serving cell, comprising:

at least one processor; and at least one memory including computer program code;

the at least one memory and the computer program code configured to, with the at least one processor, cause the UE at least to perform:

triggering the PHR to a network node to report Power Headroom (PH) of the serving cell, wherein the PHR is triggered upon the following event:

activation of the serving cell if a first Bandwidth Part (BWP) of the serving cell is not a dormant BWP and if the serving cell is a Secondary Cell (SCell) of a medium access control (MAC) entity, wherein the MAC entity is with configured uplink; and continuing downlink Reference Signal measurements without reporting to a network node until the PHR is triggered after the active BWP switches from a dormant to a non-dormant BWP or the active BWP on the serving cell switches from a non-dormant BWP to a dormant BWP.

2. The UE of claim 1, wherein the reported PH is indicated by one of the following:

Type 1 PH;

Type 3 PH;

a designated field indicating whether the PH is Type 1 or Type 3; or a designated field indicating whether the serving cell is on a dormant BWP or non-dormant BWP.

3. The UE of claim 1, wherein the reported PH for the serving cell is Type 1 PH with a virtual field indicating a PUSCH reference format is used, or wherein the reported PH for the serving cell is Type 3 PH depending on whether there is a Sounding Reference Signal (SRS) transmission on the dormant BWP when the PHR is reported.

4. The UE of claim 1, wherein the PHR triggering is upon switching the active BWP from a dormant BWP to a non-dormant BWP if no PHR is reported for the serving cell when the active BWP is a dormant BWP.

5. The UE of claim 1, wherein the PHR triggering is upon activation of the serving cell when the active BWP of the serving cell is not a dormant BWP.

6. The UE of claim 1, wherein the triggering of the PHR is configured by the network node.

7. The UE of claim 1, wherein the triggering of the PHR is made on a per serving cell when the active BWP is a dormant BWP.

8. A system for a Power Headroom Report (PHR) for a serving cell, comprising a user equipment (UE) and at least a network node, wherein an active Bandwidth Part (BWP) of the serving cell is a dormant BWP;

wherein the UE comprises:

at least one first processor; and at least one first memory including first computer program code;

the at least one first memory and the first computer program code configured to, with the at least one first processor, cause the UE at least to perform:

triggering the PHR to the network node to report Power Headroom (PH) of the serving cell, wherein the PHR is triggered upon the following event:

activation of the serving cell if a first Bandwidth Part (BWP) of the serving cell is not a dormant BWP and if the serving cell is a Secondary Cell (SCell) of a medium access control (MAC) entity, wherein the MAC entity is with configured uplink; and continuing downlink Reference Signal measurements without reporting to the network node, until the PHR is triggered after the active BWP switches from a dormant to a non-dormant BWP or the active BWP on the serving cell switches from a non-dormant BWP to a dormant BWP;

wherein the network node comprises:

at least one second processor; and at least one second memory including second computer program code;

the at least one second memory and the second computer program code configured to, with the at least one second processor, cause the network node at least to perform:

receiving the PHR from the UE to report PH of the serving cell; and obtaining a PH value for the serving cell from the PHR.

9. A method for power headroom reporting to a network node associated with a plurality of serving cells, comprising:

triggering, by a user equipment (UE), a power headroom report (PHR) to the network node to report Power Headroom (PH) of a serving cell, wherein the PHR is triggered upon the following event:

activating of the serving cell if a first Bandwidth Part (BWP) of the serving cell is not a dormant BWP and if the serving cell is a Secondary Cell (SCell) of a medium access control (MAC) entity, wherein the MAC entity is with configured uplink; and continuing downlink Reference Signals measurements without reporting to the network node, until the PHR is triggered after the active BWP switches from a dormant BWP to a non-dormant BWP.

10. The method of claim 9, wherein the reported PH for the serving cell is indicated by one of the following:

Type 1 PH;

Type 3 PH;

a designated field indicating whether the PH is Type 1 or Type 3; or a designated field indicating whether the serving cell is on a dormant BWP or non-dormant BWP.

11. The method of claim 9, wherein the reported PH for the serving cell is Type 1 PH with a virtual field indicating a PUSCH reference format is used, or wherein the reported PH for the serving cell is Type 3 PH depending on whether there is a Sounding Reference Signal (SRS) transmission on the dormant BWP when the PHR is reported.

12. The method of claim 9, wherein the PHR triggering is upon switching the active BWP from a dormant BWP to a non-dormant BWP if no PHR is reported for the serving cell when the active BWP is a dormant BWP.

* * * * *